United States Patent
Rozenwald et al.

(10) Patent No.: US 8,943,059 B2
(45) Date of Patent: Jan. 27, 2015

(54) SYSTEMS AND METHODS FOR MERGING SOURCE RECORDS IN ACCORDANCE WITH SURVIVORSHIP RULES

(75) Inventors: Guy Rozenwald, Ra'anana (IL); Uri Haham, Karkur (IL); Gary Machol, Kfar Saba (IL)

(73) Assignee: SAP SE, Walldorf (DE)

( * ) Notice: Subject to any disclaimer, the term of this patent is extended or adjusted under 35 U.S.C. 154(b) by 123 days.

(21) Appl. No.: 13/333,073

(22) Filed: Dec. 21, 2011

(65) Prior Publication Data

US 2013/0166552 A1   Jun. 27, 2013

(51) Int. Cl.
*G06F 17/30* (2006.01)

(52) U.S. Cl.
CPC .................. *G06F 17/3071* (2013.01)
USPC ........................... 707/737; 707/748

(58) Field of Classification Search
CPC ........................ G06F 17/3071; G06F 17/30303
USPC ............... 707/737, 999.005, 999.003, 999.01
See application file for complete search history.

(56) References Cited

U.S. PATENT DOCUMENTS

| | | | | |
|---|---|---|---|---|
| 6,604,110 | B1 * | 8/2003 | Savage et al. | 707/602 |
| 7,493,344 | B2 * | 2/2009 | Wald et al. | 1/1 |
| 7,603,350 | B1 * | 10/2009 | Guha | 1/1 |
| 7,895,174 | B2 * | 2/2011 | McCormack et al. | 707/705 |
| 7,966,291 | B1 * | 6/2011 | Petrovic et al. | 707/641 |
| 8,166,033 | B2 * | 4/2012 | Kazi et al. | 707/737 |
| 8,364,692 | B1 * | 1/2013 | Allen et al. | 707/758 |
| 8,682,866 | B1 * | 3/2014 | McDill et al. | 707/692 |
| 2001/0004737 | A1 * | 6/2001 | Laux | 707/1 |
| 2003/0046280 | A1 * | 3/2003 | Rotter et al. | 707/6 |
| 2003/0084053 | A1 * | 5/2003 | Govrin et al. | 707/100 |
| 2004/0006506 | A1 * | 1/2004 | Hoang | 705/10 |
| 2004/0107189 | A1 * | 6/2004 | Burdick et al. | 707/3 |
| 2004/0181512 | A1 * | 9/2004 | Burdick et al. | 707/3 |
| 2004/0199781 | A1 * | 10/2004 | Erickson et al. | 713/200 |
| 2004/0243587 | A1 * | 12/2004 | Nuyens et al. | 707/100 |
| 2005/0065945 | A1 * | 3/2005 | Heusermann | 707/100 |
| 2005/0071194 | A1 * | 3/2005 | Bormann et al. | 705/2 |
| 2005/0154615 | A1 * | 7/2005 | Rotter et al. | 705/3 |

(Continued)

OTHER PUBLICATIONS

Jens Bleiholder et al., "Data Fusion", ACM Computer Surveys, vol. 41, No. 1, Article 1, Dec. 2008, XP055068629, ISSN: 0360-0300, DOI:10.1145/1456650.1456651, (pp. 1-41, 41 total pages).

(Continued)

*Primary Examiner* — Miranda Le
(74) *Attorney, Agent, or Firm* — Buckley, Maschoff & Talwakar LLC (57) ABSTRACT

According to some embodiments, a plurality of source records may be received from a plurality of data sources, with each source record including a plurality of fields. It may be determined that a match group of source records from different data sources relate to the same entity, and a single best record may be automatically created for the match group based on field values from different source records in the match group. The creating may includes, for example, assigning a first set of fields to a first survivorship group associated with a first survivorship rule and a second set of fields to a second survivorship group associated with a second survivorship rule. All records in the match group may then be simultaneously ranked in accordance with the first and second survivorship rules using a single query. The best record could then be stored for subsequent use by other applications.

24 Claims, 10 Drawing Sheets

(56) References Cited

U.S. PATENT DOCUMENTS

| | | | |
|---|---|---|---|
| 2006/0010119 A1* | 1/2006 | Jonas | 707/3 |
| 2006/0075323 A1* | 4/2006 | Singh et al. | 715/500 |
| 2006/0294151 A1* | 12/2006 | Wong et al. | 707/200 |
| 2008/0052102 A1* | 2/2008 | Taneja et al. | 705/1 |
| 2008/0195579 A1* | 8/2008 | Kennis et al. | 707/3 |
| 2008/0243967 A1* | 10/2008 | Bhatia et al. | 707/206 |
| 2008/0319983 A1* | 12/2008 | Meadows | 707/5 |
| 2009/0125796 A1* | 5/2009 | Day et al. | 715/219 |
| 2009/0182780 A1* | 7/2009 | Wong et al. | 707/200 |
| 2009/0234826 A1* | 9/2009 | Bidlack | 707/5 |
| 2010/0223231 A1* | 9/2010 | Lee | 707/610 |
| 2011/0106821 A1* | 5/2011 | Hassanzadeh et al. | 707/749 |
| 2012/0023107 A1* | 1/2012 | Nachnani et al. | 707/748 |
| 2012/0072464 A1* | 3/2012 | Cohen | 707/803 |

OTHER PUBLICATIONS

David Loshin, "Identity Resolution, Cleansing, and Survivorship", The Data Roundtable: Customer Data Integration, Data Enrichment, Data Integration, Data Quality, Master Data Management, Apr. 13, 2010 (2010-04-o13), XP055068633, Retrieved from the Internet: URL:http://www.dataroundtable.com/?p=1892, [retrieved on Jun. 27, 2013]. (pp. 1-5, 5 pages total).

Communication: "The Extended European Search Report", European Patent Office, Jul. 5, 2013, for European Application No. 12008228.4-1951/2608074, 9pgs.

* cited by examiner

Figure 1:
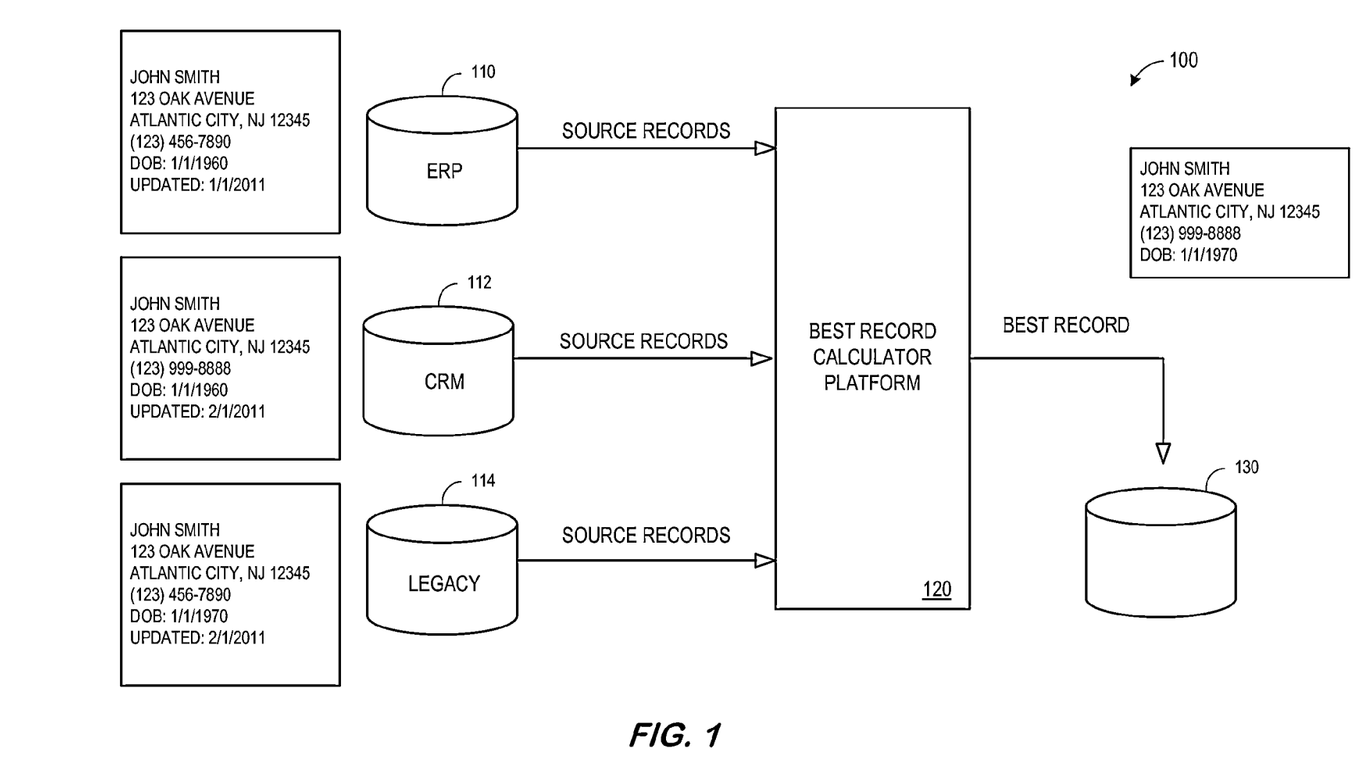
FIG. 1 is a block diagram of a system that might be associated with record consolidation according to some embodiments.

FIG. 10 ay, for example, be associated with different business applications, and may be queried or otherwise output data source records. According to some embodiments, one or more data sources might be associated with an Enterprise Resource Planning ("ERP") system 110. As other examples, a data source might be associated with a Client Relation Management ("CRM") system 112 or a legacy system 114 (e.g., associated with an older database application). Note that any of the source records might be stored within or be otherwise associated with physical tables of a database, including column-based in-memory tables. Any of the databases described herein may comprise a relational database such as SAP MaxDB, Oracle, Microsoft SQL Server, IBM DB2, Teradata, and the like. As another example, the data sources might be associated with a multi-dimensional database, an eXtendable Markup Language ("XML") document, or any other structured data storage system. The physical tables may be distributed among several relational databases, dimensional databases, and/or other data sources.

A best record calculator platform 120 may receive source records from the various data sources 110, 112, 114. For example, the best record calculator platform 120 might import the source records from a remote data source via HyperText Transport Protocol ("HTTP") communication or any other type of data exchange. The best record calculator platform 120 and/or data sources might be associated with, for example, Personal Computers ("PC"), servers, and/or mobile devices.

The best record calculator platform 120 may consolidate and/or merge the source records received from the data sources and store one or more "best" records into a best record database 130 in accordance with any of the embodiments described herein. For example, a human resources database and a sales representative database might both contain records about the same employee. In this case, the best record calculator platform 120 might automatically consolidate the multiple records to create a single best record for that employee. Such a goal might be associated with, for example, a master data management program.

According to some embodiments, a consolidation of records is associated with a two phase process of (i) identifying potential duplicates or "matches" and then (ii) merging the records into a single best record representing an entity. Note that large sets of data might be extracted from multiple legacy systems into the best record calculator platform 120 and include some obvious, straight forward duplicates that need to (and can be) resolved and merged immediately after the data is imported into the best record calculator platform 120. In many cases, the duplicate detection will be straight forward, such as when it is based on a well defined identifier that can't be interpreted in ambiguous ways. Examples of such identifiers include a Social Security Number to identify individuals or a Global Trade Item Number ("GTIN") to detect duplicate materials.

In some cases, however, duplicate records may need to be merged into a single physical record, but conflicting data values may exist among different records. For example, as illustrated in FIG. 1 the ERP system 110 may contain a record with a Date of Birth ("DOB") field having a value of "Jan. 1, 1960" while a legacy system 114 has a record associated with the same entity ("John Smith") having a DOB value of "Jan. 1, 1970." According to some embodiments described herein, a mechanism may be provided to facilitate consolidation in any such conflict situation.

Conflicting information may be consolidated or merged in accordance with various survivorship rules. For example, a reliability score might be assigned to different data sources

SYSTEMS AND METHODS FOR MERGING SOURCE RECORDS IN ACCORDANCE WITH SURVIVORSHIP RULES

FIELD

Some embodiments relate to a creation of a record based on a number of different source records. More specifically, some embodiments provide systems and methods for creating a record in accordance with survivorship rules.

BACKGROUND

A business or enterprise may store information about various entities in the form of electronic records. For example, a company might have an employee database where each row in the database represents a record containing information about a particular employee (e.g., the employee's name, date of hire, and salary). Moreover, different electronic records may actually be related to a single entity. For example, a human resources database and a sales representative database might both contain records about the same employee. In some cases, it may be desirable to consolidate multiple records to create a data store that contains a single electronic record for each entity represented in the database. Such a goal might be associated with, for example, a master data management program.

Currently, the consolidation process in a master data management program is a time consuming and operation. For example, several different consolidation rules might be applied in sequence, and each application might require a separate database query and/or a creation of an intern version of the data until a final record is created. Such an approach, however, may be impractical when a substantial number of records and/or input data sources are involved (e.g., hundreds of thousands of source records may need to be consolidated).

Accordingly, a method and mechanism for efficiently and accurately handling and/or merging input data records may be provided in accordance with some embodiments described herein.

DETAILED DESCRIPTION

FIG. 1 is a block diagram of a system 100 that might be associated with record consolidation. The system 100 includes a number of data sources storing records, each record containing a number of fields (e.g., a business partner name, address, and telephone number). Different data sources records (e.g., the ERP system 110 might always be assumed to be more reliable than a CRM system 112). As another example, recency might indicate that more recent data is more reliable as compared to older data. Note that conflicts for different fields in source records might be resolved using different survivorship rules. In the example of FIG. 1, a "default" survivorship rule might indicate that the ERP system 110 is more reliable than the CRM system 112 and, in the event of a reliability "tie" then the most recent data is to be trusted more than older data. Moreover, for telephone number fields, the sources are to be trusted (in descending order): the CRM system 112, the legacy system 113, and, finally, the ERP system 110 (with recency being a secondary tiebreaker). Finally, for DOB values, the legacy system 114 is most trusted, followed by the CRM system 112, and ERP system 110.

As a result, the calculate best record platform 110 may examine the telephone number for John Smith and determine that the "(123) 999-8888" value is to be used in the best record database 130 because the CRM system 112 is more reliable than both the ERP system 110 and legacy system 114, at least for telephone numbers. In contrast, the DOB value of "Jan. 1, 1970" from the legacy system 114 is used in the best record database 130 because, according to the rules, the legacy system 114 is more reliable than either the ERP system 110 or CRM system 112.

Note that FIG. 1 represents a logical architecture according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip® disk, magnetic tape, and solid state Random Access Memory (RAM) or Read Only Memory (ROM) storage units. Embodiments are therefore not limited to any specific combination of hardware and software.

Figure 2:
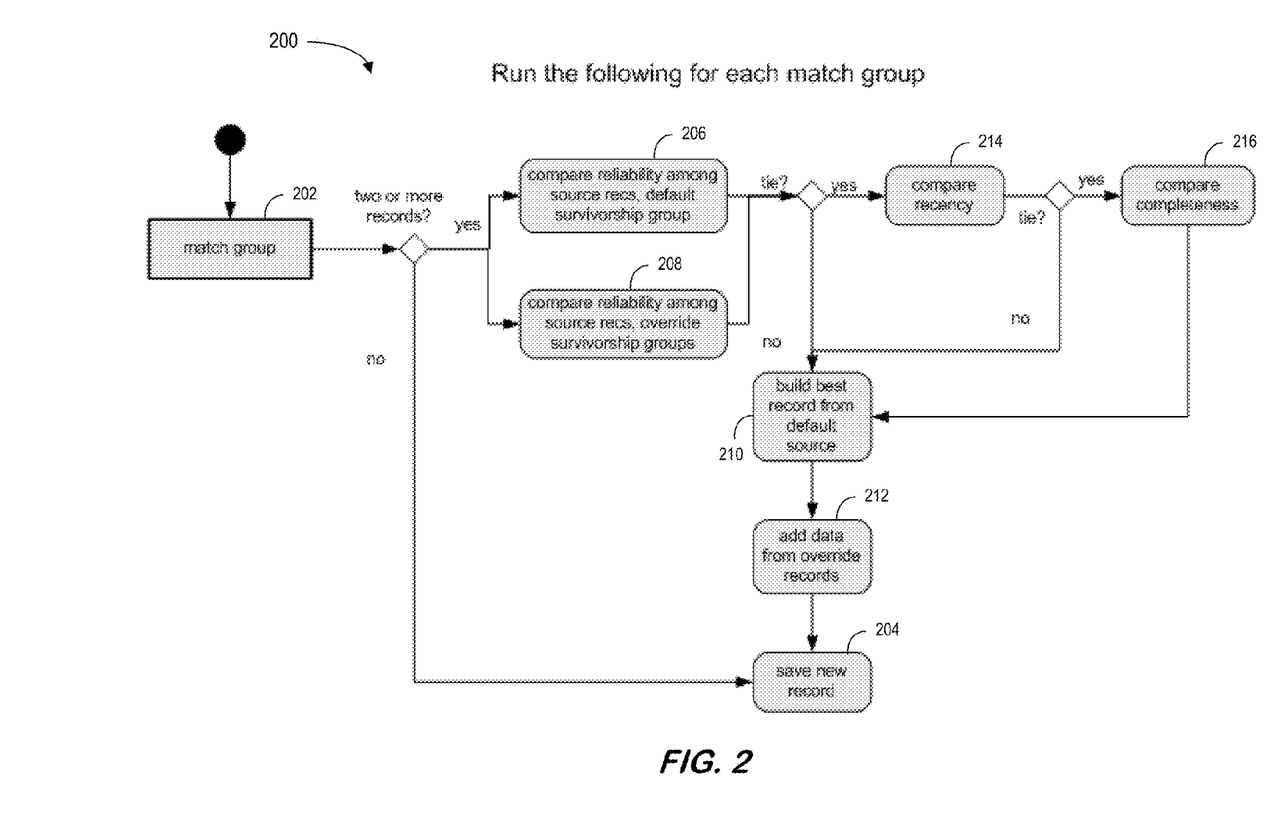
FIGS. 2 through 5 illustrate data flows associated with record consolidation according to some embodiments.

The calculate best record platform 120 may perform the data consolidation described herein in a number of different ways. For example, FIG. 2 illustrates a data flow 200 associated with record consolidation according to some embodiments. At 202, a "match group" of source records may be determined. As used herein, the "match group" may refer to collection of records (including source records) that refer to the same real world entity (e.g., person, product, or company). Moreover, the term "source record" may refer to any original data describing a single record, from a given source. According to some embodiments, source records may be previously cleansed and/or transformed into an appropriate format.

If there is only a single source record for an entity, it may simply be saved as the "best record" available at 204. If there are multiple source records for a single entity, then survivorship rules, or rules to determine which record is to be taken as most accurate, may be applied at 206 and 208. Different fields may be associated with different survivorship rules. For example, a "survivorship group" may represent a set of fields that are all to be associated with the same survivorship rule (e.g., DOB and telephone numbers are both to be trusted from system A as compared to system B). Moreover, a default survivorship rule might be applied to fields that do not belong to any particular survivorship rule. If a clear winner is determined at 206 and 208, the "best record" may be taken from the winning source at 210, data from override records may be added at 212, and the new record may be saved at 204 as the best record.

If there is "tie" between two sources after applying the survivorship, recency (or the record most recently updated within its source system) may be used as a tie breaker at 214. If recency does not resolve the tie, completeness (the record with the greatest number of populated fields) may be used as a tie breaker at 216. Note that in this data flow 200, each record may be processed individually and may require the use of a temporary table to gradually build records into a final best record.

Figure 3:
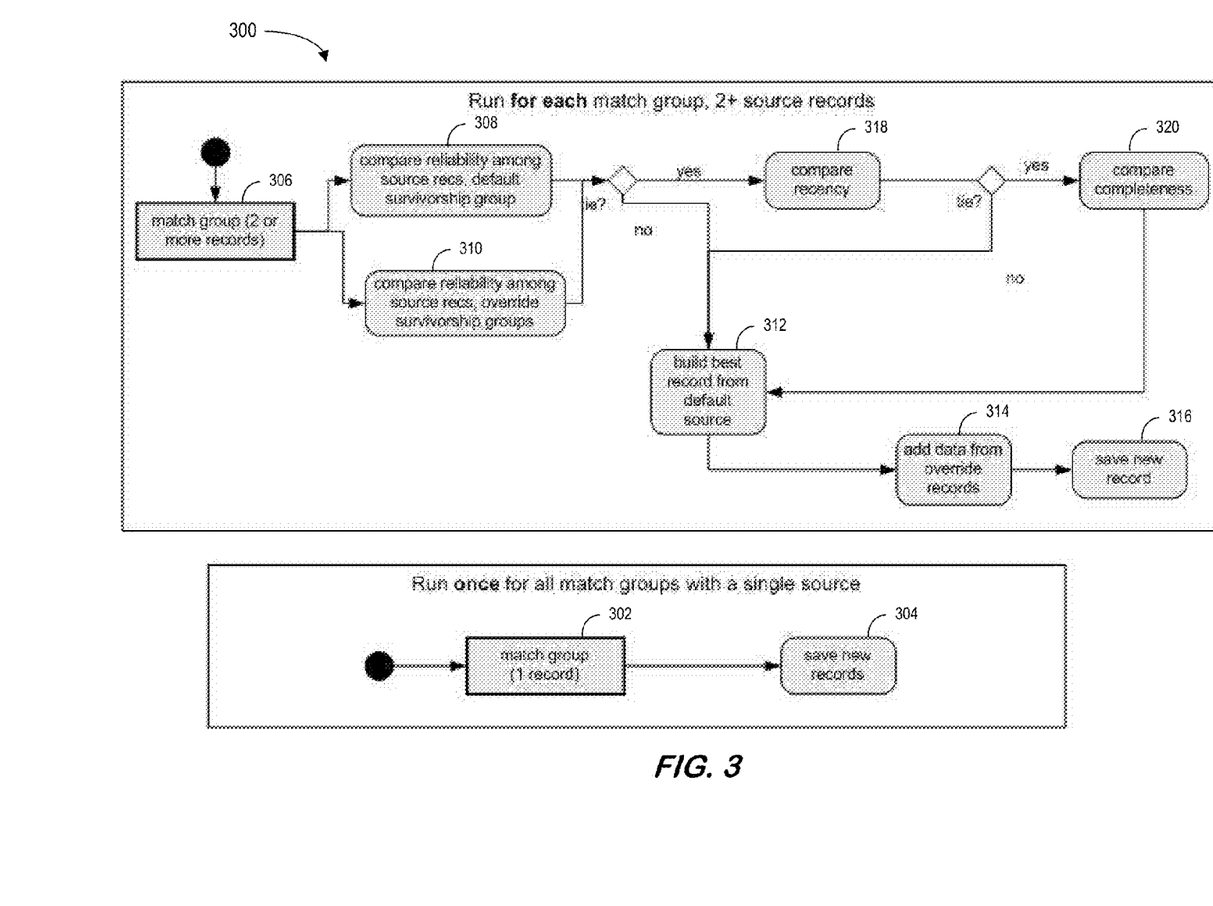

To improve performance, FIG. 3 illustrates a data flow in accordance with some embodiments. In particular, a single query may be used to determine all match groups that have one record at 302, which are then simply saved as the best record at 304. Note that 302 and 304 may only need to be run once for all match groups associated with a single source record. All match groups that have two more records are determined at 306, and survivorship rules may be applied at 308 and 310. If a clear winner is determined at 308 and 310, the "best record" may be taken from the winning source at 312, data from override records may be added at 314, and the new record may be saved at 316 as the best record.

If there is "tie" between two sources after applying the survivorship, recency may be used as a tie breaker at 318. If recency does not resolve the tie, completeness may be used as a tie breaker at 320.

Figure 4:
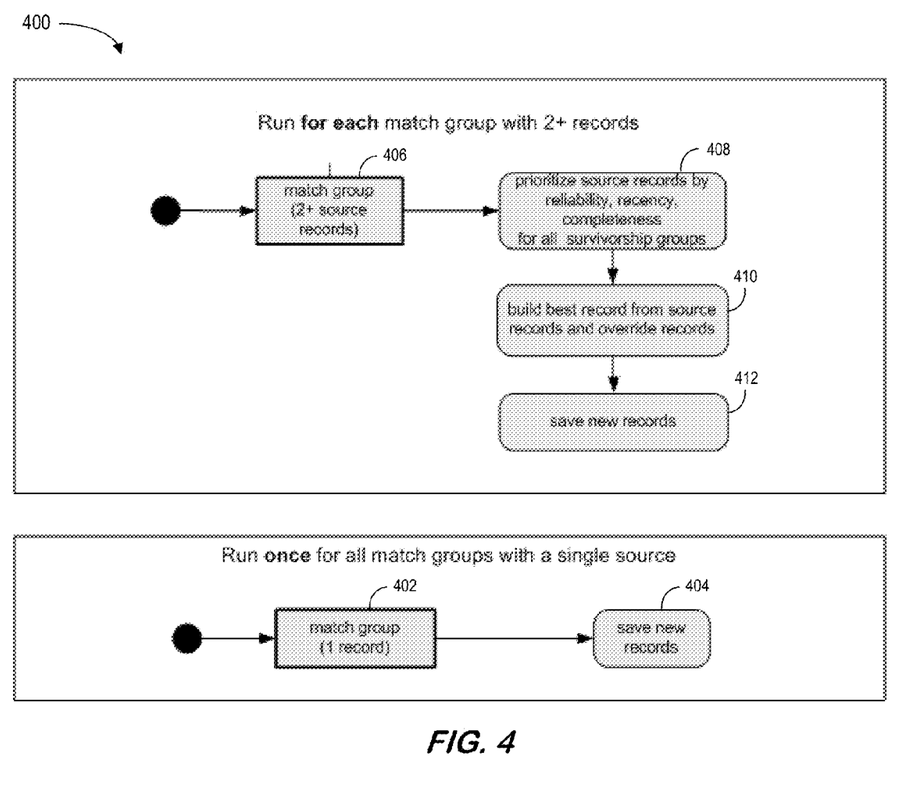

To further improve performance, FIG. 4 illustrates a data flow 400 in accordance with embodiments described herein. As in FIG. 3, a single query may be used to determine all match groups that have one record at 402, which are then simply saved as the best record at 404 (402 and 404 may only need to be run once for all match groups associated with a single source record). All match groups that have two more records are determined at 406 and source records may be prioritized at 408 by reliability, recency, and completeness for all survivorship groups. Note that 408 may be associated with an algorithm having the configured survivorship rules built-in and a record may be built for each match group as an atomic action. Moreover, all source records within a match group may be ranked by all survivorship rules in single query and each survivorship group may be represented by a single source record chosen according to survivorship rules.

At 410, the best record may be constructed from the chosen source records in a single Software Query Language ("SQL") statement and then be saved at 412. Note that such an approach may avoid the need for temporary or intern tables thus improving performance. Moreover, each match group (with more than one source) may be calculated sequentially and stored procedure code may be auto-generated and deployed after configuration changes. Note that determining the execution path at run time may require looping over each survivorship rule making parallel processing difficult. Determining the execution path at compile time, however, may eliminate the requirements for looping and, in fact, facilitate parallel processing.

Figure 5:
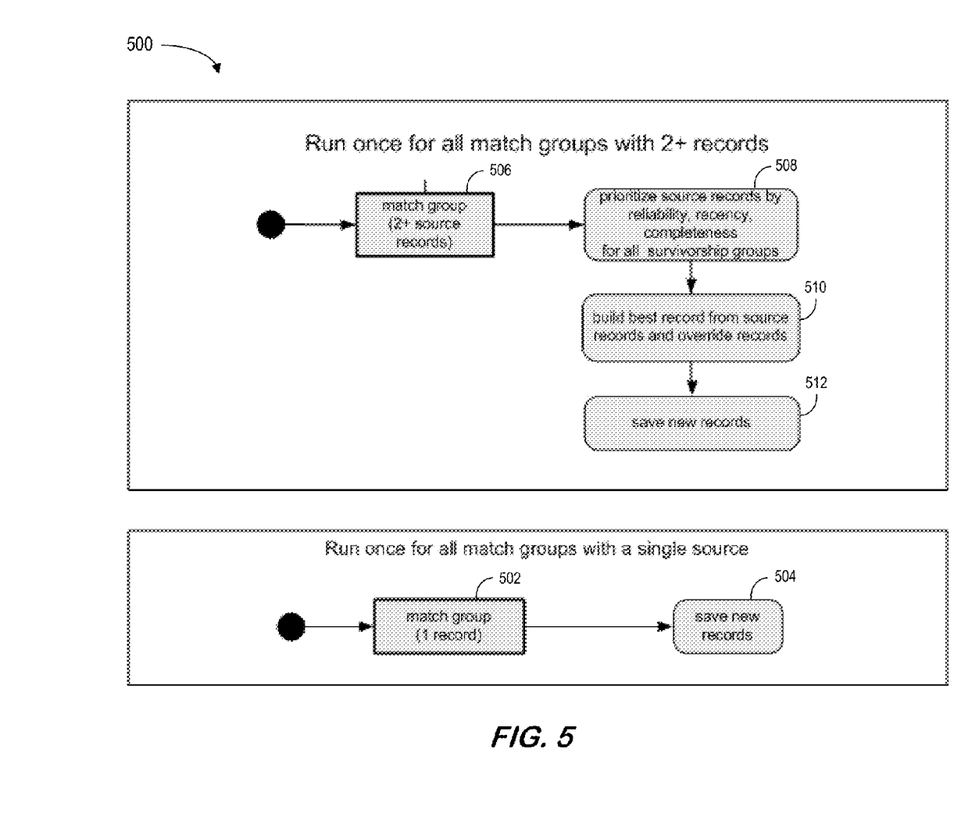

Thus, some embodiments may provide an algorithm such that all best records from all match groups may be built simultaneously using a single query. For example, FIG. 5 illustrates a data flow 500 in accordance with some embodiments wherein a single query may be used to determine all match groups that have one record at 502, which are then simply saved as the best record at 504 (as before 502 and 504 may only need to be run once for all match groups associated with a single source record). All match groups that have two more records are determined at 506 and source records may be prioritized at 508 by reliability, recency, and completeness for all survivorship groups. At 510, the best record may be constructed from the chosen source records in a single SQL statement and then be saved at 512.

According to some embodiments, when a user configures survivorship groups and the rules associated with each group, a process may be automatically triggered to generate code customized for that user's configuration. Such an approach may avoid the necessity of dynamic branching based on the configuration and allow for optimization to be hard-coded as appropriate. Moreover, in some cases a record may be chosen per survivorship group, simultaneously for all groups, giving a nearly flat performance curve as the number of survivorship groups increases and the best record may be built using a single construction process, rather than building it incrementally over each of the survivorship groups (reducing the required processing steps). Moreover, best records for all match groups may be constructed simultaneously—this gives a nearly flat performance curve as the number of match groups increases.

Consider, for example, how survivorship rules and survivorship groups may be modeled. In particular, "default" record-level survivorship groups with survivorship rules may cover all fields that are not covered in other survivorship groups:

```
<recordLevel>
    <survivorshipRules>
        <ruleType order="1" xsi:type="Reliability">
            <sourceSystem order="1">ERP</sourceSystem>
            <sourceSystem order="2">CRM</sourceSystem>
        </ruleType>
        <ruleType order="2" xsi:type="Recency"/>
    </survivorshipRules>
</recordLevel>
```

The resulting pseudo code associated with those default rules may be as follows:

select name, streetAddress, city, state, zip, telephone . . .

from all_recs_in_match_group join all_match_groups order by matchGroupId, getReliability(matchGroupId, srcRecs,{'ERPVCRM'}), getRecency(matchGroupId, srcRecs) as RecordGroup Next, one or more override survivorship groups (covering two fields) and its survivorship rules may be configured:

```
<group name="BirthGroup">
    <survivorshipRules>
        <ruleType xsi:type="Recency" order="1"/>
        <ruleType xsi:type="Completeness" order="2"/>
        <ruleType xsi:type="Reliability" order="3">
            <sourceSystem order="1">CRM</sourceSystem>
            <sourceSystem order="2">SRM</sourceSystem>
            <sourceSystem order="3">ERP</sourceSystem>
        </ruleType>
    </survivorshipRules>
    <fields>
        <fieldPath>birthPlace</fieldPath>
        <fieldPath>birthDate</fieldPath>
    </fields>
</group>
```

The resulting pseudo code associated with those override rules may be as follows:

select matchGroupId,birthPlace, birthDate from all_recs_in_match_group join all_match_groups order by matchGroupId, getRecency(matchGroupId, srcRecs), getCompleteness(matchGroupId, srcRecs), getReliability(matchGroupId, srcRecs,{'CRMVSRM-VERP'}) as BirthGroup A best record may then be constructed from several source records, simultaneously for all match groups, as follows:

select match_group_id,

RecordGroup.name,

RecordGroup.streetAddress,

RecordGroup.city,

RecordGroup.state,

RecordGroup.zip,

RecordGroup.telephone,

BirthGroup.birthPlace,

BirthGroup.birthDate from RecordGroup join BirthGroup join all_match_groups//where RecordGroup & BirthGroup are as defined above According to some embodiments, the use of imperative logic (e.g., for, while, and if statements) may be avoided and a typical SQL approach may be preferred. Moreover, the use of bulk inserts, volatile column tables for storing temporary data, and/or column tables for fast joins over small numbers of columns may further improve performance of the system.

Figure 6:
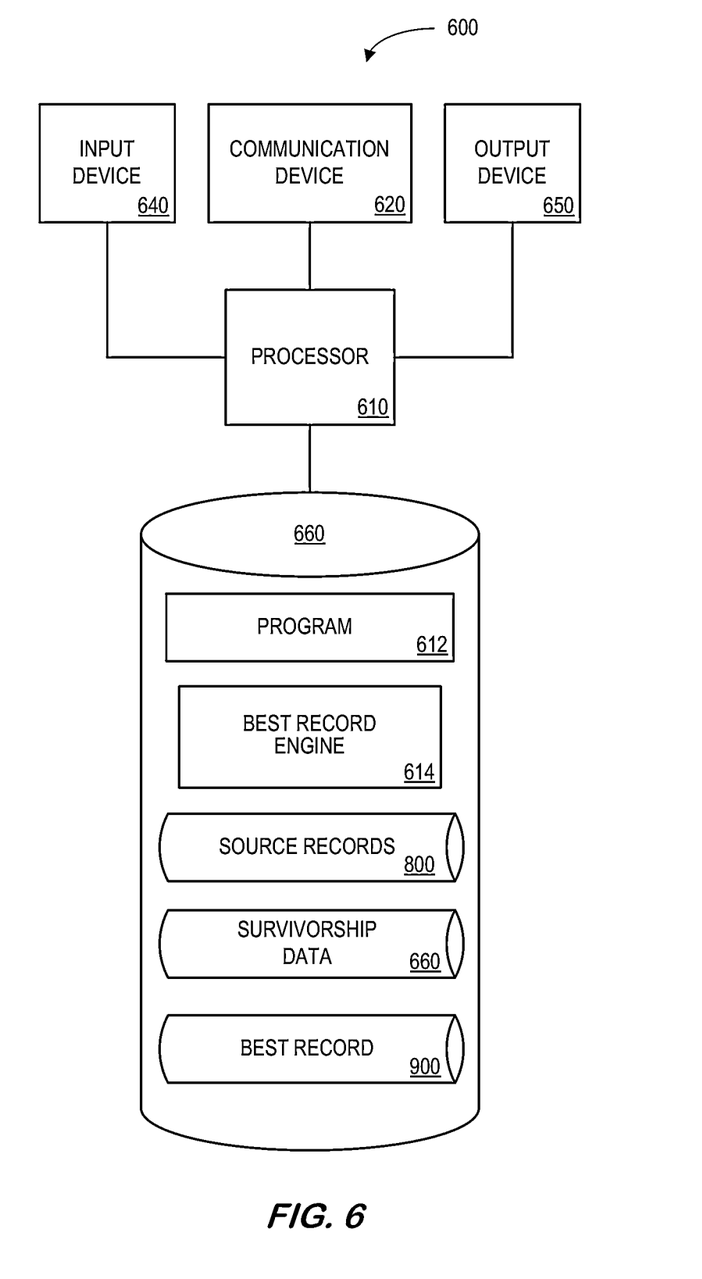
FIG. 6 is a block diagram of a platform according to some embodiments.

Note that the code generation and/or best record construction may be performed by any appropriate device. For example, FIG. 6 is a block diagram overview of a best record calculator platform 600 according to some embodiments. The best record calculator platform 600 may be, for example, associated with the system 100 of FIG. 1. The best record calculator platform 600 comprises a processor 610, such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more remote data sources, best record databases, and/or operators. The best record calculator platform engine 600 further includes an input device 640 (e.g., a mouse and/or keyboard to enter survivorship groups and/or rules) and an output device 650 (e.g., a computer monitor to display a user interface element and/or record consolidation reports).

The processor 610 communicates with a storage device 630. The storage device 630 may comprise any appropriate information storage device, including combinations of magnetic storage devices (e.g., a hard disk drive), optical storage devices, and/or semiconductor memory devices. The storage device 630 stores a program 612 and/or best record engine application 614 for controlling the processor 610. The processor 610 performs instructions of the programs 612, 614, and thereby operates in accordance with any of the embodiments described herein. For example, the processor 610 may receive a plurality of source records from a plurality of data sources, with each source record including a plurality of fields. The processor 610 It may then determine that a match group of source records from different data sources relate to the same entity, and a single best record may be automatically created for the match group based on field values from different source records in the match group. For example, the processor 610 may assign a first set of fields to a first survivorship group associated with a first survivorship rule and a second set of fields to a second survivorship group associated with a second survivorship rule. All records in the match group may then be simultaneously ranked by the processor 610 in accordance with the first and second survivorship rules using a single query. The best record could then be stored for subsequent use by other applications.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the best record calculator platform 600 from another device; or (ii) a software application or module within the best record calculator platform 600 from another software application, module, or any other source.

Figure 8:
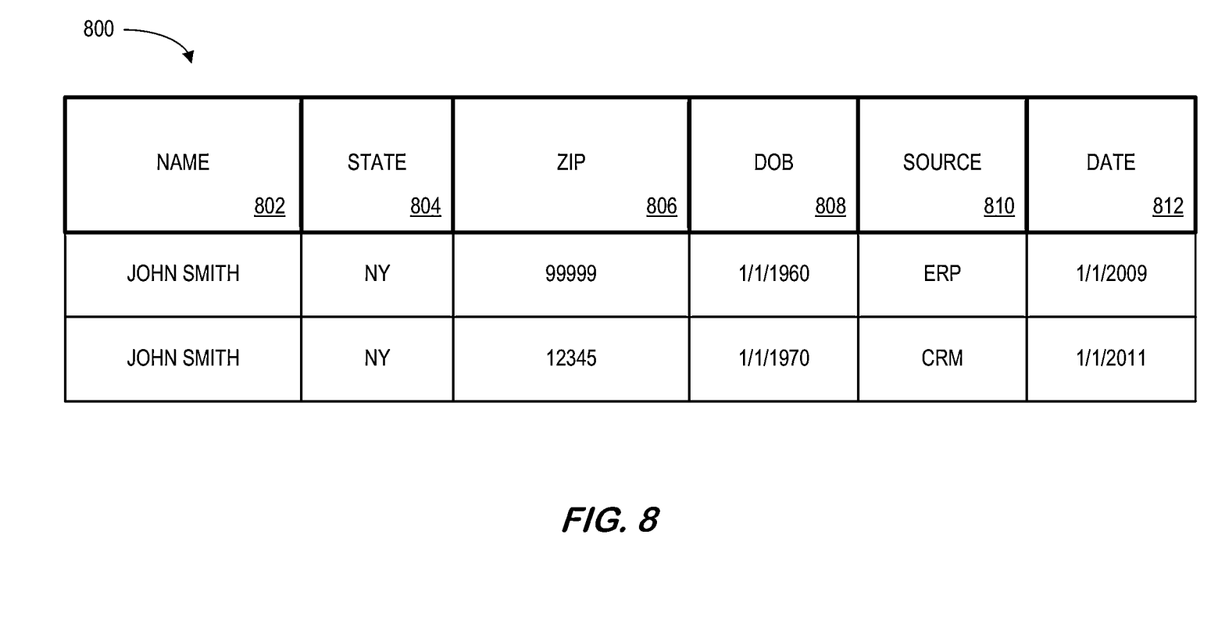
FIG. 8 illustrates a portion of a source record database according to some embodiments.
Figure 9:
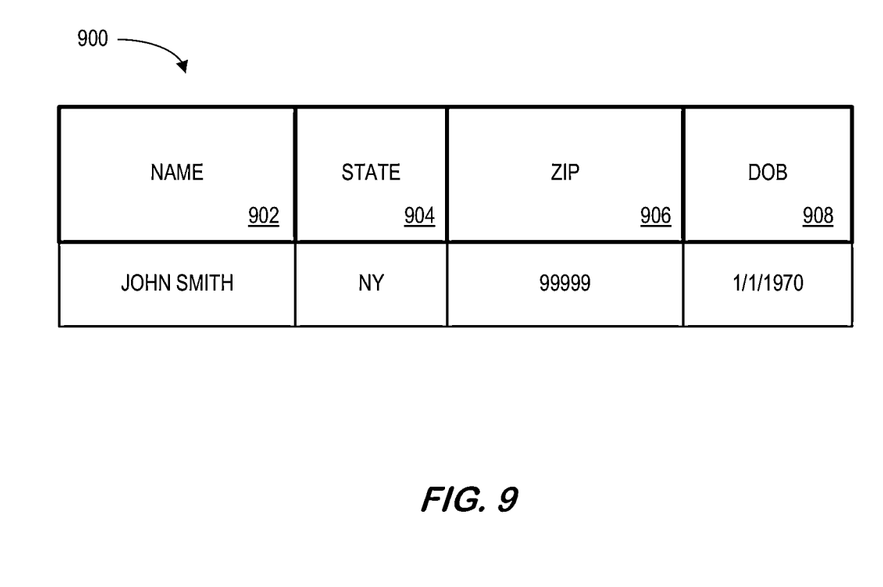
FIG. 9 illustrates a portion of a best record database according to some embodiments.

In some embodiments (such as shown in FIG. 6), the storage device 630 stores a source records database 800 containing records received from data sources, a survivorship database 660 (storing information about survivorship groups and/or rules), and a best record database 900 (described with respect to FIG. 9). One example of a source records database 800 that may be used in connection with the best record calculator platform 800 will be described in detail with respect to FIG. 8. Note that the databases described herein are examples, and additional and/or different information may be stored therein. Moreover, various databases might be split or combined in accordance with any of the embodiments described herein.

Figure 7:
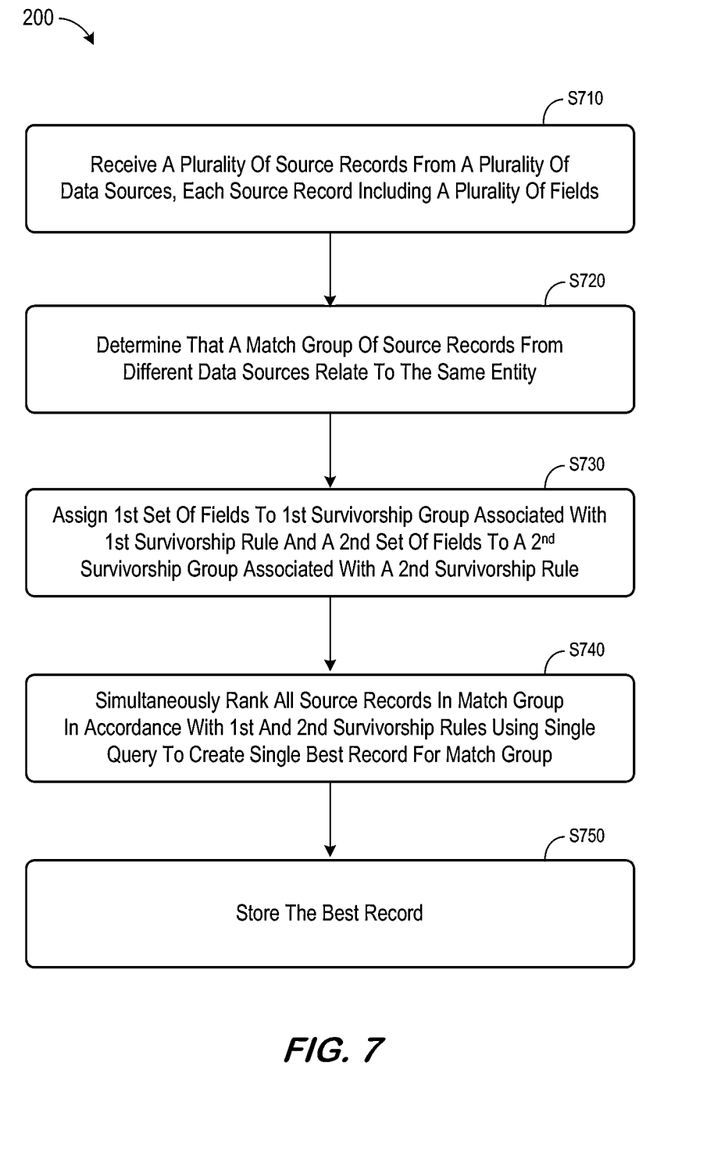
FIG. 7 is a flow diagram of a process in accordance with some embodiments.

The best record calculator platform 600 may operate in accordance with any of the embodiments described herein. For example, FIG. 7 is a flow diagram of a process 700 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S710, a plurality of source records may be received from a plurality of data sources, each source record including a plurality of fields. The data sources might be associated with, for example, an ERP database, a CRM database, a human resources database, and/or a legacy database. At S720, it may be determined that a match group of source records from different data sources relate to the same entity.

According to some embodiments, a single best record may be automatically created for the match group based on field values from different source records in the match group. In particular, at S730, a first set of fields may be assigned to a first survivorship group associated with a first survivorship rule and a second set of fields may be assigned to a second survivorship group associated with a second survivorship rule. The survivorship rules may be, for example, associated reliability, recency, and/or completeness. According to some embodiments, survivorship configuration information is received from a user (e.g., via a GUI) and, based on the received survivorship configuration information, code may be automatically generated to, when executed, create the single best record. The code may, for example, create a default survivorship group, an override survivorship group, and a single query may construct the best record simultaneously for multiple match groups.

At S740, all source records in the match group may be simultaneously ranked in accordance with the first and second survivorship rules using a single query. According to some embodiments, a single source record may be calculated for each survivorship group according to a plurality of survivorship rule dimensions. Moreover, source records may be calculated for multiple survivorship groups simultaneously and the creation of the best record may be associated with a column-based in-memory table. At S750, the best record may be stored (e.g., to be used by other applications).

By way of example, FIG. 8 is a table is shown that represents the source records database 800 that may be stored at the best record calculator platform 600 according to some embodiments. The table may include, for example, entries identifying related records that may need to be combined and/or merged. The table may also define fields 802, 804, 806, 808, 810, 812 for each of the entries. The fields 802, 804, 806, 808, 810, 812 may, according to some embodiments, specify: a name 802, a state 804, a ZIP code 806, a DOB 808, a source 810, and a date 812. The information in the source records database 800 may be created and updated, for example, based on information received from data sources (including, in some cases, legacy data sources).

The name 802 may be, for example, an alphanumeric sequence associated with a person. The state 804 and ZIP code 806 may represent the person's home location and the DOB 808 may represent his or her date of birth. The source 810 might indicate where the information in the entry came from (e.g., an ERP or CRM system) and the date 812 might indicate the last time the information was updated. Note that ZIP code 806 and the DOB 808 from the ERP and CRM system are different.

Following the example set forth with respect to FIG. 5, assume that most fields (except the DOB 808) should take values from the most reliable system (with the ERP source 810 being most reliable), but the DOB 808 should take values from the most recent record (as defined by the date 812).

In such a case, FIG. 9 illustrates a table that represents the best record database 900 that may be stored at the best record calculator platform 600 according to some embodiments. The table may include, for example, entries identifying records that have been combined and/or merged. The table may also define fields 902, 904, 906, 908 for each of the entries. The fields 902, 904, 906, 908 may, according to some embodiments, specify: a name 902, a state 904, a ZIP code 906, and a DOB 908. The information in the source records database 900 may be created and updated, for example, based on an algorithm executed by the best record calculator platform 600.

The name 902 may be, for example, an alphanumeric sequence associated with a person. The state 904 and ZIP code 906 may represent the person's home location and the DOB 908 may represent his or her date of birth. Note that most fields, including the ZIP code 906, come from the most reliable system (the ERP), but the DOB 908 comes from the most recent record, per the user's survivorship configuration.

According to some embodiments, at least one of a survivorship group or rule is automatically adjusted based on historical information. For example, it might be determined that a survivorship rule has, in the past, not improved the quality of data in the best record database and a different approach or threshold might be automatically selected or adjusted.

Figure 10:
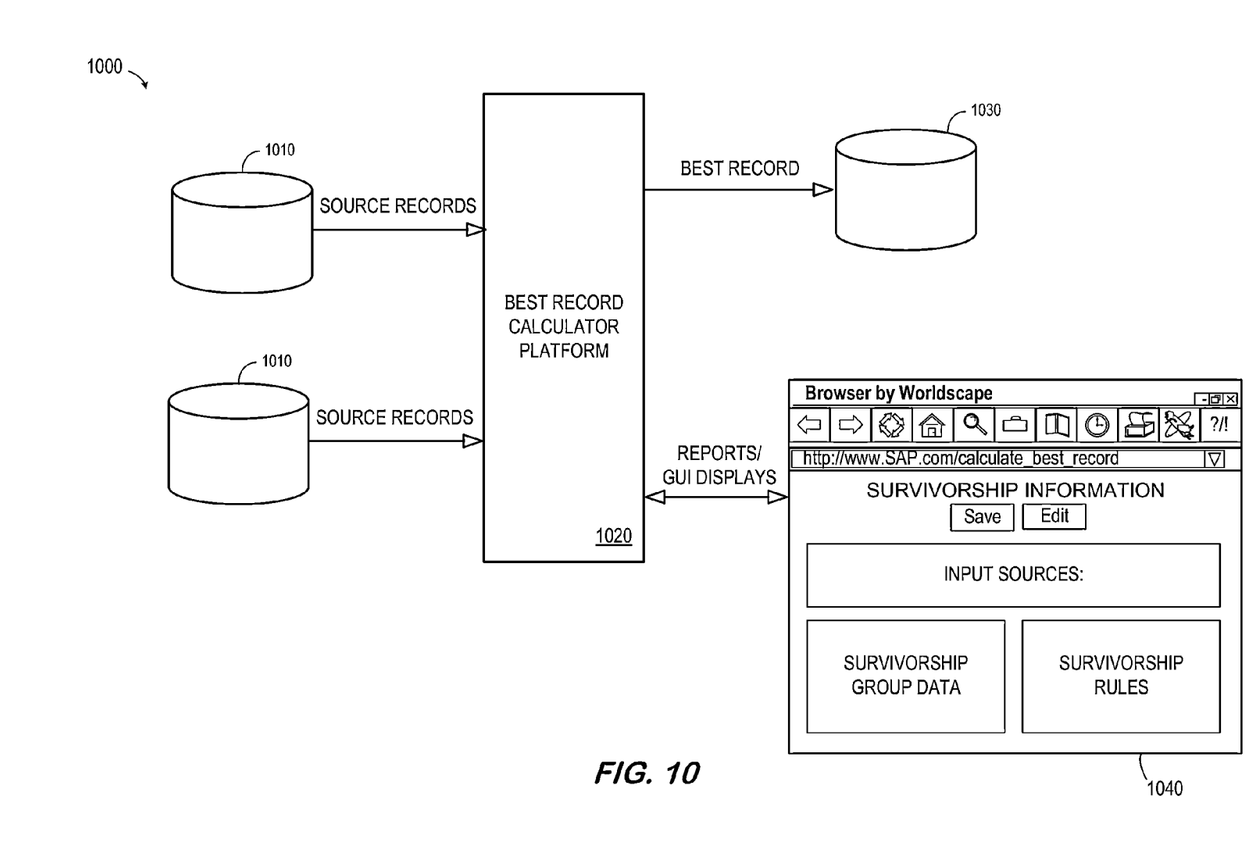
FIG. 10 is a block diagram of a system that might be associated with record consolidation according to some embodiments.

FIG. 10 is a block diagram of a system 1000 that might be associated with record merging and/or consolidation. The system 1000 includes data sources 1010 storing records, each record containing a number of fields (e.g., a business partner name, license number, and postal address). A best record calculator platform 1020 may receive source records from the data sources 1010. The best record calculator platform 1020 may consolidate and/or merge the source records received from the data source 1010 and store best records into a best record database 1030 in accordance with any of the embodiments described herein.

According to some embodiments, the best record calculator platform 1020 can also receive test data from a test source during a simulation mode. The test data may be used, for example, to detect why certain fields in the best record database 1030 are empty or incorrect. Moreover, a GUI 1040 may be used to receive survivorship group and survivorship rule information from an operator and/or to provide reports to the operator. Accordingly, the GUI 1040 may provide that survivorship groups and/or survivorship rules may be easily configured and changed by a business user. There may be no required technical knowledge; instead the user may need only to determine the business requirements, which may be directly translated into a configuration, and, from there, into actual working code.

Thus, some embodiments described herein may provide for the auto-generation of processing code according to survivorship configuration (rules and groups) such that branching within the code may be reduced or avoided. As a result, the processing code may be substantially optimized to a user's specific survivorship configuration. Moreover, for each survivorship group one source record (e.g., a "highest priority" record) may calculated according to all survivorship rule dimensions. The calculation may be, according to some embodiments, carried out simultaneously for all survivorship groups. In addition, a best record may be constructed or built with a single construction process (rather than building it incrementally over each of the survivorship groups) and best records for all match groups may be constructed simultaneously (which may provide a nearly flat performance curve as the number of match groups increase).

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to particular types of data, note that embodiments may be associated with other types of information. For example, sales orders, financial information, and health data may be processed in accordance with any of the embodiments described herein.

Moreover, while embodiments have been illustrated using particular series of steps, embodiments may be implemented in any other of a number of different ways. For example, different types of survivorship groupings and/or rule applications may be applied in accordance with any of the embodiments described herein.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method, comprising:
    receiving a plurality of source records from a plurality of data sources, each source record including a plurality of fields;
    determining that a match group of source records from different data sources relate to the same entity;
    automatically creating a single best new record for the match group based on field values from different source records in the match group, wherein said creating includes:
        assigning a first set of fields to a first survivorship group associated with a first survivorship rule, the first survivorship rule indicating that the first set of fields are trusted from a first source over a second source,
        assigning a second set of fields to a second survivorship group associated with a second survivorship rule, the second survivorship rule indicating that the second set of fields are trusted from the second source over the first source, and
    simultaneously ranking all source records in the match group in accordance with the first and second survivorship rules using a single query;
    calculating a single source record for each survivorship group based on a plurality of survivorship rule dimensions;
    identifying match groups that contain only a single source record, wherein said creating is not automatically performed for the identified match groups; and
    storing the single best new record.

2. The method of claim 1, wherein at least one of the first or second survivorship rule is associated with at least one of: (i) reliability, (ii) recency, or (iii) completeness.

3. The method of claim 1, wherein at least one of the data sources comprises at least one of: (i) an enterprise resources planning database, (ii) a client relation management database, (iii) a human resources database, or (iv) a legacy database.

4. The method of claim 1, further comprising:
    identifying match groups that contain only a single source record, wherein said creating is not performed for the identified match groups.

5. The method of claim 1, further comprising:
    receiving from a user survivorship configuration information; and
    based on the received survivorship configuration information, automatically generating code to, when executed, create the single best new record.

6. The method of claim 5, wherein the code creates a default survivorship group, an override survivorship group, and the single query constructs the best record simultaneously for multiple match groups.

7. The method of claim 1, wherein a single source record is calculated for each survivorship group according to a plurality of survivorship rule dimensions.

8. The method of claim 7, wherein source records are calculated for multiple survivorship groups simultaneously.

9. The method of claim 1, wherein the query is associated with structured query language protocol.

10. The method of claim 1, wherein said creating is associated with a column-based in-memory table.

11. A non-transitory, computer-readable medium storing program code instructions executable by a computer processor to perform a method, the method comprising:
    receiving a plurality of source records from a plurality of data sources, each source record including a plurality of fields;

determining that a match group of source records from different data sources relate to the same entity;

creating a single best new record for the match group based on field values from different source records in the match group, wherein said creating includes:
assigning a first set of fields to a first survivorship group associated with a first survivorship rule, the first survivorship rule indicating that the first set of fields are trusted from a first source over a second source,
assigning a second set of fields to a second survivorship group associated with a second survivorship rule, the second survivorship rule indicating that the second set of fields are trusted from the second source over the first source, and
simultaneously ranking all source records in the match group in accordance with the first and second survivorship rules using a single query;

calculating a single source record for each survivorship group based on a plurality of survivorship rule dimensions;

identifying match groups that contain only a single source record, wherein said creating is not automatically performed for the identified match groups; and storing the single best new record.

12. The medium of claim 11, wherein at least one of the first or second survivorship rule is associated with at least one of: (i) reliability, (ii) recency, or (iii) completeness.

13. The medium of claim 11, wherein at least one of the data sources comprises at least one of: (i) an enterprise resources planning database, (ii) a client relation management database, (iii) a human resources database, or (iv) a legacy database.

14. The medium of claim 11, wherein execution of the program code instructions further cause the computer processor to perform:
receiving from a user survivorship configuration information; and
based on the received survivorship configuration information, automatically generating code to, when executed, create the single best new record.

15. The medium of claim 14, wherein the automatically generated code creates a default survivorship group, an override survivorship group, and the single query constructs the best record simultaneously for multiple match groups.

16. The medium of claim 11, wherein a single source record is calculated for each survivorship group according to a plurality of survivorship rule dimensions, and further wherein source records are calculated for multiple survivorship groups simultaneously.

17. The medium of claim 11, wherein the query is associated with structured query language protocol and said creating is associated with a column-based in-memory table.

18. A system, comprising:
a storage device to store a best record data store and a source data store, the source data store to provide a plurality of source records associated with different data sources, each source record including a plurality of fields; and
a processor to (i) receive the source records from the source data store and (ii) store a single best new record into the best record data store, wherein the processor creates a single best record for the match group based on field values from different source records in the match group, wherein said creating includes:
assigning a first set of fields to a first survivorship group associated with a first survivorship rule, the first survivorship rule indicating that first set of fields are trusted from a first source over a second source,
assigning a second set of fields to a second survivorship group associated with a second survivorship rule, the second survivorship rule indicating that the second set of fields are trusted from the second source over the first source, and
simultaneously ranking all source records in the match group in accordance with the first and second survivorship rules using a single query, calculating a single source record for each survivorship group based on a plurality of survivorship rule dimensions; and identifying match groups that contain only a single source record, wherein said creating is not automatically performed for the identified match groups.

19. The system of claim 18, wherein at least one of the first or second survivorship rule is associated with at least one of: (i) reliability, (ii) recency, or (iii) completeness.

20. The system of claim 18, wherein at least one of the data sources comprises at least one of: (i) an enterprise resources planning database, (ii) a client relation management database, (iii) a human resources database, or (iv) a legacy database.

21. The system of claim 18, wherein the processor is further to perform:
receiving from a user survivorship configuration information; and
based on the received survivorship configuration information, automatically generating code to, when executed, create the single best new record.

22. The system of claim 21, wherein the automatically generated code creates a default survivorship group, an override survivorship group, and the single query constructs the best record simultaneously for multiple match groups.

23. The system of claim 18, wherein a single source record is calculated for each survivorship group according to a plurality of survivorship rule dimensions, and further wherein source records are calculated for multiple survivorship groups simultaneously.

24. The system of claim 18, wherein the query is associated with structured query language protocol and said creating is associated with a column-based in-memory table.

* * * * *